US005686882A

United States Patent [19]

Giani

[11] Patent Number: 5,686,882

[45] Date of Patent: Nov. 11, 1997

[54] SILENT ALARM BAND

[76] Inventor: Sandra M. Giani, 3947 Carpenter St. Ste/ 150, Studio City, Calif. 91604

[21] Appl. No.: 603,435

[22] Filed: Feb. 20, 1996

[51] Int. Cl.$^6$ .................................... H04B 3/36

[52] U.S. Cl. .................... 340/407.1; 340/573; 340/575; 340/539; 368/12; 368/230

[58] Field of Search .................... 340/407.1, 575, 340/573, 539; 368/12, 230

[56] References Cited

U.S. PATENT DOCUMENTS

| | | | |
|---|---|---|---|
| 4,093,944 | 6/1978 | Muncheryan | 340/407.1 |
| 4,144,706 | 3/1979 | Willis | 368/12 |
| 4,297,677 | 10/1981 | Lewis et al. | 340/566 |
| 4,379,639 | 4/1983 | Stephens | 368/12 |
| 4,380,759 | 4/1983 | Sulkoski et al. | 340/407.1 |
| 4,591,836 | 5/1986 | Feigenblatt, Jr. et al. | 340/574 |
| 4,728,934 | 3/1988 | Pfander et al. | 340/407.1 |
| 4,731,603 | 3/1988 | McRae et al. | 340/407.1 |
| 4,853,674 | 8/1989 | Kiss | 340/407.1 |
| 5,361,241 | 11/1994 | Ferrara et al. | 368/281 |
| 5,388,992 | 2/1995 | Franklin et al. | 340/407.1 |

*Primary Examiner*—Jeffery Hofsass
*Assistant Examiner*—Timothy Edwards, Jr.
*Attorney, Agent, or Firm*—Julius Rabinstein

[57] ABSTRACT

The silent alarm comprises a wrist band housing which can be attached to the wrist of a person. A signal receiving device is mounted in the wrist band housing for receiving a signal from a clock controlled transmitter. Vibratory means are also mounted in the housing and are connected to the signal receiving device. A battery is mounted in the wrist band to energize the vibratory means when the signal receiving device receives a signal in order to quietly awaken a sleeping person wearing the wrist band.

3 Claims, 2 Drawing Sheets

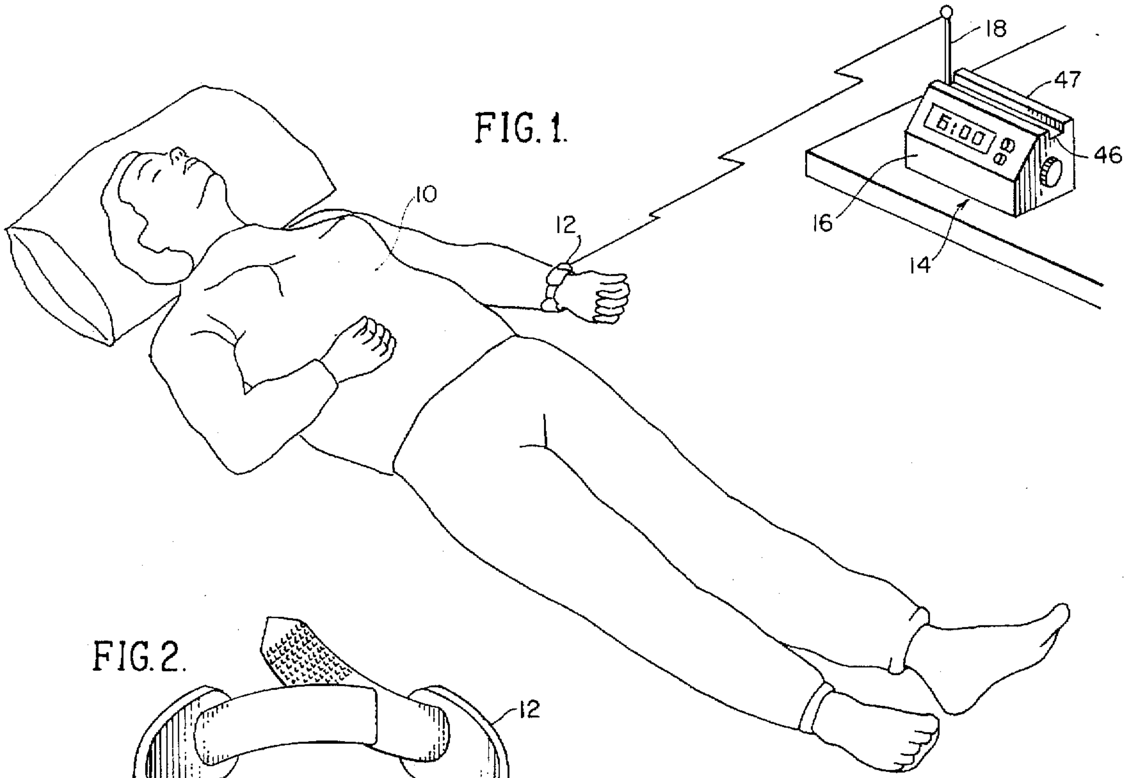
FIG. 1.
FIG. 2.
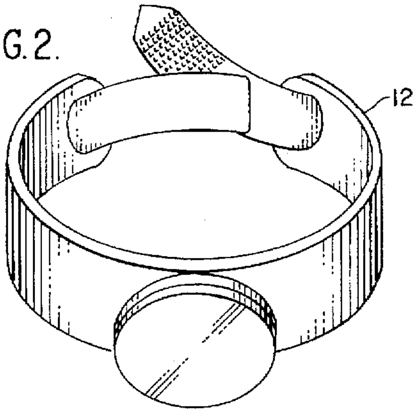
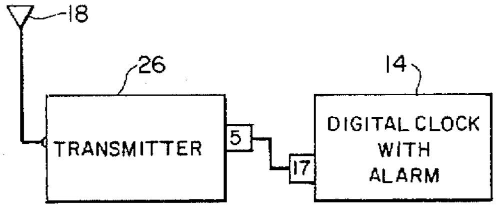
FIG. 3.
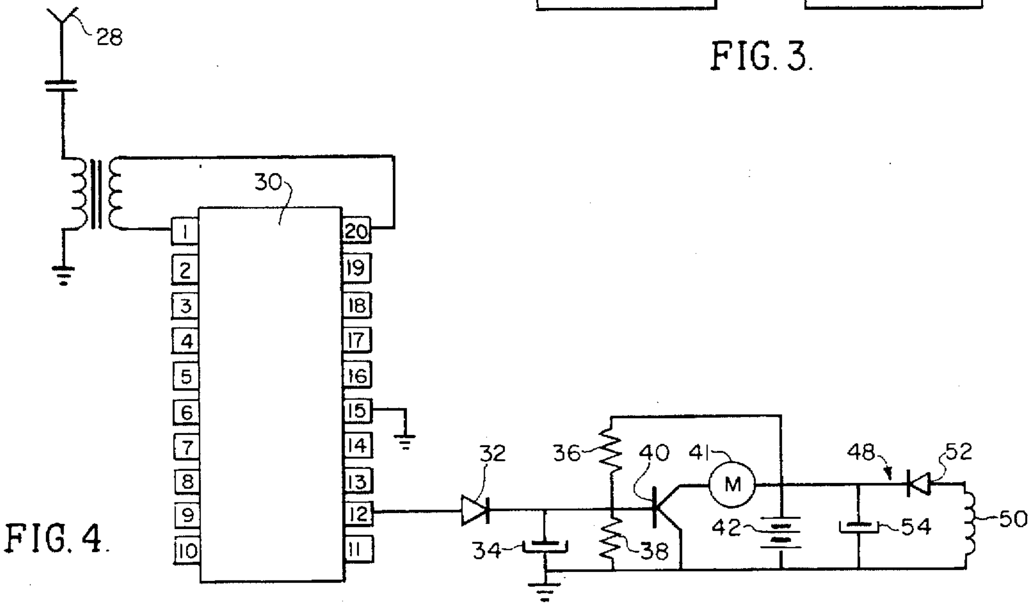
FIG. 4.

SILENT ALARM BAND

This invention relates to a silent alarm and more particularly to a silent alarm which can be worn on the body of a person to awaken a sleeper without making any audible noise.

FEDERAL ASSISTANCE

This invention was made without the assistance or financial support from any federal agency or it's agents.

PRIOR ART

Heretofore, alarm systems, both auditory and vibratory have been used to notify people that at a certain time they have to take medication or wake up. In addition, it was desirable for persons not sleeping alone that the alarm be silent so that the other person not be disturbed. These patents are exemplified by the patent et al Fossard U.S. Pat. No. 3,786,628, the Australian Patent to Madrers, #630324, the Raven U.S. Pat. No. 5,020,037, Barnett U.S. Pat. No. 2,853,182, and Backner U.S. Pat. No. 5,157,640.

Most of these patents use an alarm clock, e.g. a wrist watch alarm, to remind people to take their medication at a proper time. Of these patents, the patent to Fossard is designed to provide an alarm for the deaf or the partially deaf. Fossard uses an alarm clock and suggests putting a time actuated vibrating device under a pillow on which the head of a sleeper rests, and letting the vibrations wake the person up.

PROBLEMS WITH PRIOR ART

Fossard is similar in function to applicant's device, but it has problems which make it unsuitable for its purpose. As Fossard says on column 2 line 58 the vibration under the pillow will wake up a sleeping person. The problem is that people do not sleep in a fixed position. Instead they move around in their bed while asleep. It is not uncommon for people to move around so much that their pillow along with the Fossard device, if they use one, falls off the bed. In circumstances where it is particularly important for a sleeping person to wake up in time for an important appointment without waking up another person, the Fossard device is too uncertain to depend on.

SOLUTION TO THE PROBLEM

Applicant, taking into consideration the fact that people move around on their bed in their sleep, realized that a silent waking device or vibrator had to be attached to the sleeping person. Moreover, he discovered that a wire connection from the alarm clock to the silent waking or vibrating device, as taught by Fossard would not be satisfactory because as stated above, it did not take into consideration that people move around so much the clock mechanism or wire mechanism could be pulled and broken. To prevent this from happening, applicant enclosed a silent signaling device in a wrist band, or other body embracing device, and inserted a radio transmitter or high frequency sound transmitter inside the alarm clock housing. This eliminated the need for a wire connection between the alarm clock and the sleeper. In this way, the wrist or body embracing band could not fall off the person during sleep. For convenience the term wrist band is meant to include any kind of body embracing device, having means to adhere to the body of a person.

The Australian patent to Madrers #630324 teaches the idea of putting a container on a wrist watch which has an alarm. It occurred to applicant that a vibrating mechanism could be inserted in the compartment instead of pills. However, this would be unsatisfactory because Madrers speaks of a tiny audible alarm which does not require much energy. Silent signaling or vibrating devices, in contrast, do require a great deal of energy, so that wrist watches which have, tiny batteries could not drive any signaling or vibrating device with enough force to waken a sleeping person.

BRIEF SUMMARY OF INVENTION

For that reason, applicant had to resort to another approach to overcome the problems that made the prior art devices unsatisfactory. Recent improvements in solid state devices has led to a substantial decrease in the size and energy requirements of radio transmitters and receivers. This suggested to applicant that a radio or high frequency sound transmitter could be mounted inside an alarm clock housing along with a charging coil. In addition, one or more batteries and a small receiver tuned to the frequency of the radio transmitter would be mounted inside a band housing along with a silent wakening or vibrating device. The receiver would have a battery charging circuit connected to the battery so that the battery in the body embracing band housing would be fully charged each night. In this way regardless of how much the sleeper moved around on his bed, the band would always be attached and ready to wake him up at the proper time.

What is needed therefore and compromises an important object of this invention is to provide a body embracing housing which contains an electric circuit having a receiver, a silent waking device, and a battery with a charging circuit. This is used with an alarm clock which has a radio transmitter mounted in the alarm clock housing along with a charging device for charging the battery in an electric circuit in the body embracing band housing.

Another object of this invention is to provide a body embracing band housing which has a receiver, a battery with a charging circuit and a silent waking device mounted in its interior.

Yet another object of this invention is to provide a body embracing band housing containing a battery, a receiver, a charging circuit and a silent waking device mounted in its interior along with means for opening the band to replace the battery or repair the electrical components mounted inside.

These and other objects of this invention will become more apparent when better understood in the light of the accompanying drawings and specification wherein:

FIG. 1 is a perspective view showing a person sleeping in a bed with a body embracing band housing attached to his wrist, and an alarm clock nearby containing a radio transmitter with an antenna, which is positioned to transmit signals to the receiver in the body embracing band housing when the alarm clock turns on the radio transmitter.

FIG. 2 is a perspective view of the band housing containing the radio receiver, a charging circuit, a battery, and a vibrating device.

FIG. 3 is a block diagram showing the alarm clock with the transmitter and the antenna.

FIG. 4 is a block diagram of the receiving circuit mounted inside the band housing and showing its connections to a silent waking device, the battery, and the charging circuit.

Figure 5:
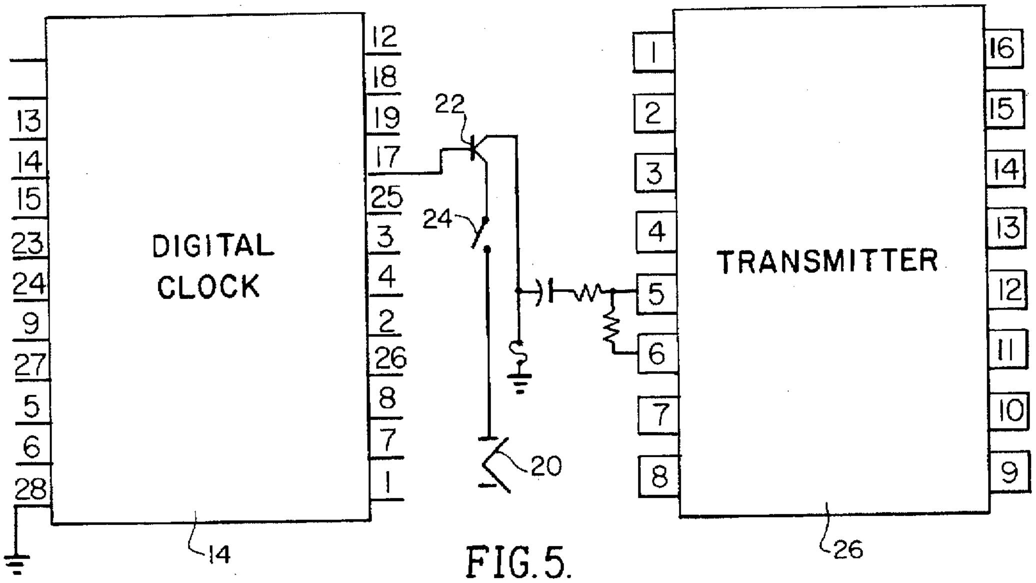
FIG. 5 shows the connection between the micro chip comprising the digital alarm clock and the connected transmitter.

Referring now to FIG. 1 of the drawings, a person 10 wearing a wrist or body receiving band housing 12 is shown sleeping on a bed. Nearby, a conventional solid state digital alarm clock 14 is mounted inside a housing 16. The solid state digital alarm clock chip 14, is shown in greater detail in the Encyclopedia of Electronic Circuits, Volume 3, page 84 by Rudolf Graf. As seen the clock housing 16 is resting on a table. The clock including the solid state chip 14 has the usual controls and display, along with an audible alarm 20, see FIG. 5. A transmitting antenna 18 projects upwardly from the housing for reasons to be described below. If desired, a conventional watch 19 may be secured to a wrist band housing, as shown in FIG. 2.

When the alarm clock is set for a predetermined time, a signal is sent from terminal 17 of the solid state device 14 shown in FIG. 5 in a manner well known in the art. This signal passes through transistor 22 and would normally activate the audible alarm 20. But since the purpose of this invention is to provide a silent alarm, an additional switch 24 is connected between the transistor 22 and the alarm 20. In this way when the clock is set for a silent alarm, switch 24 is opened, thereby disabling alarm 20. With this arrangement the signal then passes into the transmitter 26 at terminal 5 of the solid state device MC2831A shown in detail in the book Motorola Linear and Interface ICS DL 128, Rev 3, page 8–29, see FIGS. 2. This activates the transmitter 26 so that the transmitter causes the transmitting antenna 18 to send out a radio signal.

This signal as will be described below, reaches receiving antenna 28 which is connected to a conventional receiver 30 built around a single solid state chip shown in detail in the in the book Motorola Linear and Interface Integrated Circuits Q3/90 DL128 Rev 3 on page 8–37. When the signal from antenna 28 reaches the receiver 30, the receiver sends out an rf signal at receiver terminal 12 to diode 32 which rectifies the signal. The rectified signal passes through a smoothing circuit composed of a capacitor 34, a resistor 36 and resistor 38 connected as shown in FIG. 4, and on to a transistor 40 thereby turning the transistor on. When this happens, the silent waking device 41 is connected across battery 42 and is thereby actuated.

The silent wake up device could be a vibrator comprising a small electric motor, rotating a disk (not shown) having an off center weight, or a piezeo electric crystal which vibrates in accordance with a selected frequency in the receiver. Other silent means for disturbing the sleeper are contemplated.

The battery used to power wrist watches does not have enough energy to operate the vibrating device. For that reason a larger battery 42 or batteries **42*a*, 42*b*, 42*c*, and 42*d* having sufficient power to drive the silent wake up device or possibly a vibrating mechanism may be required. Even so, the energy requirements of the vibrating device would soon deplete the battery. To prevent this from happening, a charging coil 44 powered by the voltage source for the alarm clock is mounted in the housing 16 beneath the band receiving groove 46 formed in the top surface 47 the clock housing 16, see FIG. 6. The groove is sized to position the wrist band in the groove so the energy from charging coil 44 induces a voltage in induction coil 50**.

The battery charging circuit 48 comprises an induction coil 50 which is connected at one end to a rectifying diode 52 and a capacitor 54. The other end of the coil 50 is connected to the opposite pole of the battery 42, see FIG. 4.

Figure 10:
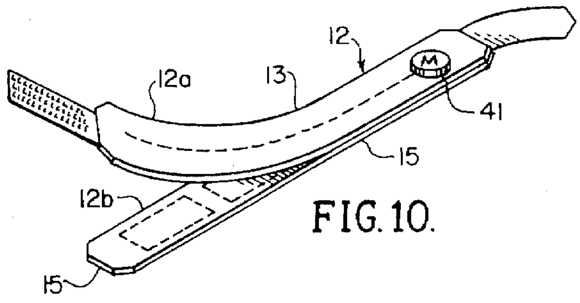
FIG. 10 shows the facing inner surfaces of the band housing being secured together with the circuit components protectively mounted on these inner surfaces.
Figure 11:
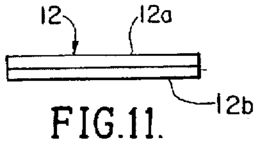
FIG. 11 is a side view showing the band housing and the two portions laminated together.

These circuit elements are to be mounted inside the wrist or body embracing band housing 12. To do this the band is formed from two strips 13 and 15 of non-conductive material, such as leather, laminated together, as shown in FIGS. 10 and 11. With this arrangement their facing surfaces **12*a* and 12*b* engage each other. In this way, the circuit elements shown in FIG. 4 can be mounted by any suitable means to these surfaces. Velcro, among other things could be used to attach the facing surfaces of the two strips to hold them together. With this arrangement, the receiving antenna 28, the receiver 30, the battery 42, the battery charging circuit 48, and the vibrating device 41 are all secured to the interior of the body embracing band. It is understood that if energy requirements require it, additional batteries, 42*a*, 42*b*, 42*c*, and 42*d* may be added to the wrist band as shown in dotted lines in FIG. 10. It is noted that the use of Velcro allows the strips 13 and 15** to be pulled apart to gain access to the electrical components between the strips for purposes of repair.

Figure 6:
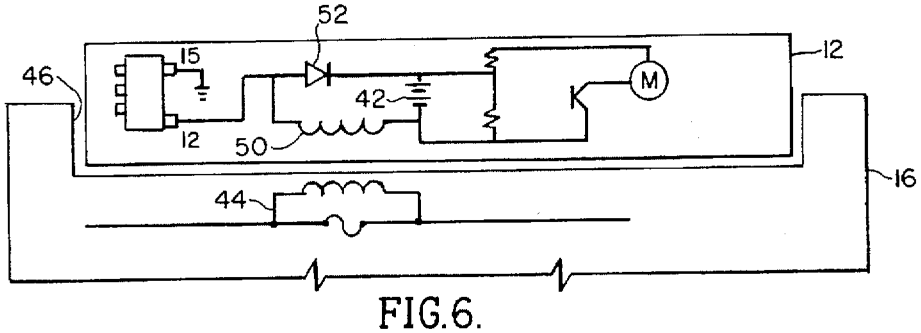
FIG. 6 shows the band housing mounted in a groove on the housing of the alarm clock and positioned so the battery in the body embracing band housing is being charged to power the circuit connections between the charging coil in the housing of the alarm clock and the circuit inside the band housing.
Figure 7:
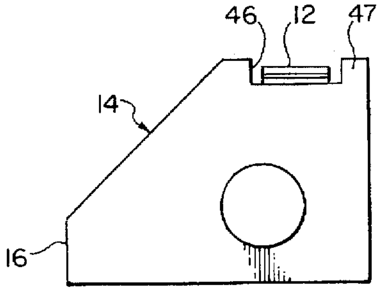
FIG. 7 is a side view of the housing for the alarm clock showing the battery in the body embracing band housing being charged, when it is in the band receiving groove in the clock housing.
Figure 8:
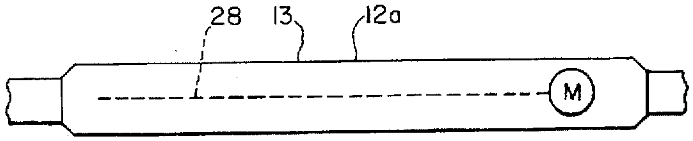
FIG. 8 is a plan view of one inner surface of the band showing an antenna mounted inside.
Figure 9:
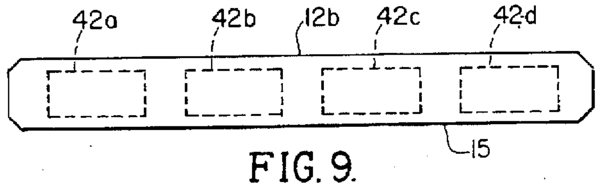
FIG. 9 is a plan view of another inner surface of the band and showing in dotted lines the batteries and circuit components attached to that surface.

When the wrist band housing 12 is not in use, it is simply laid in groove 46 as shown in FIGS. 1, 6, and 7. Consequently the ac current in the charging coil 44 will induce an ac voltage and current in the induction coil 50 between the facing surfaces of the laminated wrist band, and this induced voltage in the circuit will cause the charging circuit 48 to recharge the battery 42.

Although, up to now, radio transmitters and receivers have been discussed as the vehicle for transmitting an inaudible signal to the silent wake up device, other means are contemplated. For example, the alarm clock could be connected to a high frequency sound driver instead of the radio receiver. With this arrangement, the transmitted high frequency sound would activate a high frequency sound amplifier mounted in the wrist band 12. The output of this amplifier, (not shown), would be connected to a sound driver receiver as shown in FIG. 4. The human ear has limits to the sound frequency it can detect so the frequency of the sound driver would be adjusted so the sound it transmits is beyond the range of the human ear to avoid arousing any other person sleeping in the room. Other means for transmitting an alarm signal to the wrist band are contemplated.

Having described the invention what I claim as new is described in the claims below:

1. An electrical alarm clock in combination with a wrist band housing containing a silent waking, device, said alarm clock comprising an alarm clock housing with an electrical alarm clock circuit mounted therein, said housing having a top surface, adapted to support said wrist band, the electrical alarm cluck circuit mounted inside said alarm clock housing and including an ac charging coil mounted in said alarm clock housing close enough to said top surface of the alarm clock housing to influence electrical components on said top surface, said wrist band housing having a wrist band electric circuit mounted therein, said wrist band circuit including an induction coil, said wrist band containing a receiving circuit, a battery, rectifying means connected together along with a charging circuit for charging said battery, and a silent signaling device, said induction coil positioned so the ac voltage and current induced in it from said charging coil when said wrist band is resting on said top surface, generates an ac voltage and current in said induction coil for charging said battery, a silent signaling device in said wrist band housing connected to said battery and said wrist band circuit, a transmitting antenna mounted on said alarm clock housing and connected to said alarm clock circuit in such a way that when the alarm in the alarm clock is triggered, said transmitting antenna transmits a radio wave, said wrist band having a receiver mounted therein and connected to said silent signaling device in such a way that when said receiver receives a signal from said transmitting antenna, it actuates said silent signaling device.

2. The electrical alarm clock and body embracing band housing described in claim 1 wherein said silent signaling device is a vibrator positioned close enough to the skin of the person wearing the said band housing so that the person wearing the said band housing is awakened by the vibration of the band housing.

3. The electrical alarm clock described in claim 2 wherein a band receiving groove is formed in said top surface of said alarm clock housing so that the battery in the body embracing band housing can be charged when the band housing is laid in said band receiving groove.

* * * * *